Figure 1:
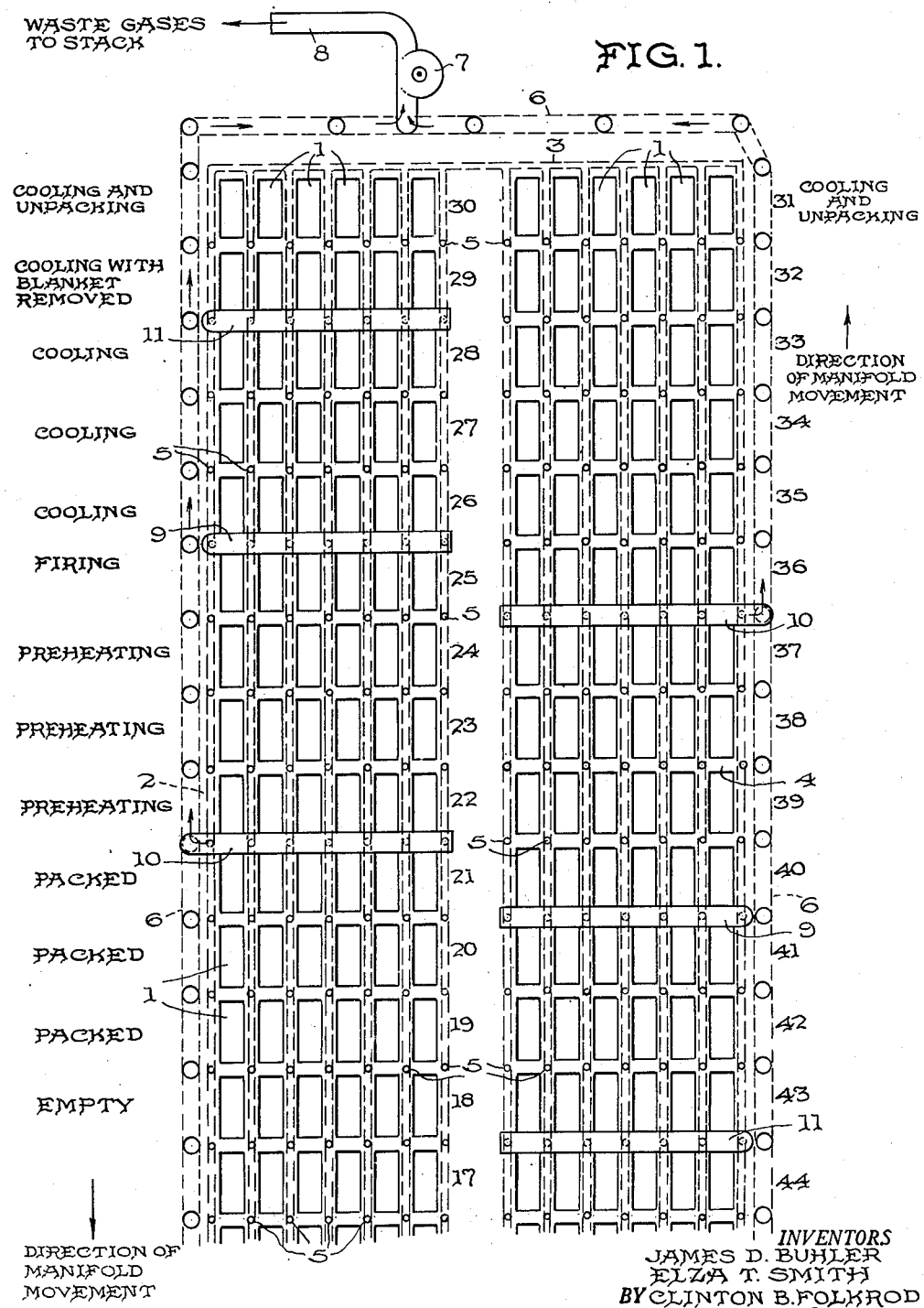

Jan. 18, 1955  J. D. BUHLER ET AL  2,699,931
HEAT TREATMENT OF SHAPED BODIES

Filed Aug. 6, 1951  2 Sheets-Sheet 2

*INVENTORS*
JAMES D. BUHLER
ELZA T. SMITH
BY CLINTON B. FOLKROD

*ATTORNEY*

2,699,931
Patented Jan. 18, 1955

United States Patent Office

2,699,931
HEAT TREATMENT OF SHAPED BODIES

James D. Buhler, Elza T. Smith, and Clinton B. Folkrod, Spokane, Wash., assignors to Kaiser Aluminum & Chemical Corporation, Oakland, Calif., a corporation of Delaware Application August 6, 1951, Serial No. 240,564

10 Claims. (Cl. 263—52)

The present invention relates to an improved method and apparatus for the heat treatment of combustible materials. More particularly, the invention is directed to an improved ring furnace and method of operation for the heat treatment of shaped combustible bodies. Specifically, the invention pertains to an improved method and apparatus for the production of baked or calcined carbonaceous shapes, such as carbon electrodes, utilizing a ring furnace of the indirect heat exchange type, including preheating, baking or firing, and cooling zones.

Many furnaces of different designs have been developed for the heat treatment of combustible materials which must be protected from oxidation or spontaneous combustion during the heating and cooling cycles of the treatment. One of the most generally used is the ring furnace developed by Meisser. The Meisser furnace is direct fired and necessitates the use of refractory saggers or retorts for containing the combustible charges placed in the pits or chambers of the furnace. However, Mendheim developed a ring furnace by which individual retorts were eliminated. His operated on an indirect heat exchange principle wherein the fluid fuel and heating gases are passed through flues in the hollow walls of the several charge-containing chambers operating on a preheating, baking or firing, and cooling cycle, so that the combustible material or shapes may be placed directly into the chambers and merely covered with packing material, such as raw petroleum coke to exclude any oxidizing atmosphere, such as air.

In general, these furnaces comprise a plurality of chambers in a longitudinal series for containing the combustible material, such as carbonaceous shapes, protected by the packing material. A flue system for indirect heat exchange is embodied in the hollow refractory walls of the chambers and the flues of each chamber are longitudinally interconnected or intercommunicating and are provided with normally closed ports at the headwalls of each chamber. In the total number of chambers comprising the entire ring furnace, several complete cycles of operation are conducted simultaneously, including preheating the material in a given number of successive chambers, firing the preheated material in the next succeeding chamber with fluid fuel combustion in the flues thereof by means of a burner unit connected through the ports, and cooling the fired material in a given number of chambers succeeding the one being fired. In the cycle, at least one chamber preceding that undergoing initial preheat is used for loading and packing, while the chamber succeeding those constituting the cooling zone is used for removal of the top portion or blanket of packing material after the uppermost layers of fired material have reached a temperature at which there is danger of oxidation or combustion upon exposure. The fired charge after further progressive cooling is unpacked layer by layer in the last several chambers of the cycle. The chambers constituting the preheating zone of the cycle are progressively heated by means of indirect heat exchange with the products of combustion from the firing chamber passing through the communicating flues of the preheat chambers. These waste gases after giving up a substantial portion of their heat content to the charges in the preheat chambers are vented from the flue system through suitable exhaust means connected to the ports in the headwall of the first preheat chamber. The gases are moved in such direction through the flue system by means of an exhaust fan or other suitable draft-inducing means remotely positioned in the waste gas exhaust system to which the flue gas exhaust means is connected. Each chamber and charge is progressively subjected to preheating, firing, and cooling by concurrent, periodic movement and connection of the burner unit and exhaust means to the flues of each succeeding chamber in the series.

In the application of such ring furnaces to the production of shaped carbonaceous bodies, such as electrodes, for use in electric furnaces, for example, aluminum reduction cells, the charge consists of shaped carbon electrodes. The raw electrode is generally composed of aggregates of calcined petroleum coke, usually with certain amounts of pulverized waste electrode butts, and pitch binders containing appreciable quantities of volatile matter. After pressing, extruding or molding, these shapes are baked in the ring furnaces to carbonize the binder, during which operation the volatiles are distilled and the shapes shrink, thus imparting the apparent density, low specific resistivity, and soundness required for use as electrodes, for example, anodes, in aluminum reduction cells.

Over the extensive period during which these ring furnaces have been used for the production of such carbon electrodes, the rates of preheating, firing and cooling, that is, the heating and cooling cycles, have been inherently very slow. In regard to the heating cycles, it has been considered absolutely necessary to maintain a slow rate in order to obtain sound electrodes with minimum cracking and breakage. For this reason the cooling rate was also allowed to remain very slow in the furnaces wherein the cooling zone and heating zone capacities were substantially the same due to the limitation imposed by the heating rate relative to the period between movement of the burner unit and exhaust means from one chamber to the next chamber in the series. Thus, the production rate of the furnace was definitely limited. As a typical example, each chamber required a period of about three to four weeks from initial preheat to complete unloading for anodes of relatively large size.

In the conventional method of operating ring furnaces, as above-described, the fuel combustion unit and the flue gas exhaust means are placed at opposite ends of the several chambers in the series which constitute the preheating and firing zone by connection to the intercommunicating flue system through the ports in the headwalls of the chambers at the respective ends of the preheating and firing zones. The products of combustion in the flue system from the firing zone are drawn through the flues in the preheating zone merely by the draft created by the remotely positioned suction fan or other exhaust means at the stack end of the exhaust main to which the several flue gas exhaust means are connected. Also, combustion air for the gas or oil fuel burners is taken in through the ports in the flue system in the cooling zone behind those through which the burner units are connected. Accordingly, in the cooling zone of the furnace, that is, the successive chambers in the cycle containing previously fired or baked material, only slight circulation of air is created by the remotely positioned draft-inducing means in the waste gas system and, accordingly, the rate of heat dissipation from the fired shapes in the chambers in the cooling zone is extremely slow. However, this slow cooling rate, as above indicated, was deemed a necessary limitation imposed by the required slow heating rate and the inability to increase the preheating capacity per cycle with the gas flow system utilized, other conditions, such as refractory wall and packing material conductivity, being the same.

Accordingly, it is a primary object and purpose of the present invention to overcome in so far as possible, this disadvantageous limitation on the production rate for a furnace of given capacity in the heat treatment of combustible shaped bodies, particularly carbon electrodes, by provision of an improved method and apparatus whereby the production capacity of any given ring furnace may be vastly increased.

It is a further and more specific object of the invention to provide an improved method of operation and an improved ring furnace for the production of baked carbon electrodes wherein a shorter total cycle is obtained, a reduction in unit fuel consumption is realized, and a significant increase in the preheating capacity of the furnace for each cycle is accomplished.

Another object of the invention is to provide an improved gas flow system for a ring furnace of the indirect heat exchange type to provide a forced flow of atmospheric air through the cooling zone to increase the cooling rate of the fired material, and to provide large volumes of preheated air for the combustion or firing zone of the furnace thereby increasing efficiency of unit fuel consumption, and also to extend the effective distance in the chambers of the series preceding the combustion chambers wherein the hot products of combustion can function to preheat the charges therein before exhausting this waste gas from the furnace.

These and other objects and advantages will be apparent from the more detailed description of the method and apparatus of the invention.

Contrary to the prior art teaching above set forth, it has been discovered according to the invention that baked combustible shapes, in particular, carbon anodes for use in aluminum reduction cells, may be produced at a vastly increased rate in a furnace of given capacity by a large increase in the cooling rate or, conversely, by a greatly reduced cooling cycle, while still maintaining a heating rate which produces fired shapes of optimum soundness, density and resistivity. Thus, the cooling rate is increased, and the heating capacity per cycle is also increased, permitting a reduction in the period required for each chamber for each phase of the cycle, which cumulatively results in a much greater production rate without sacrifice of product quality.

The present invention generally comprises the improvement in the method of operation of such ring furnaces wherein a forced flow of air is positively introduced, established and maintained in the flue system to provide a large volume of air for accelerated cooling of the fired bodies in the cooling zone. It further provides by indirect heat exchange a regulated quantity of preheated combustion air for the chamber or chambers in the cycle wherein the material, such as shapes, is being fired by means of fluid fuel combustion in the flues thereof permitting increase in firing rate and/or capacity. This forced flow of air, in addition, increases the rate of flow of heat exchange medium in the flues of the preheating zone, and makes possible an increase in the capacity of the zone, so that a larger number of unbaked shapes may be progressively and simultaneously preheated in the same cycle. In effect, the improved gas flow system providing an increased volumetric rate of circulation in the flue system greatly increases rate of operation and/or capacity in the cooling, firing and preheating zone, thus permitting a more rapid periodic movement of burner units and flue gas exhaust means from chamber to chamber in the series. The ultimate result is a reduction in the period required in the heating and cooling cycles and a vastly increased production rate for a furnace of given capacity or size.

Specifically, in a given instance the cooling rate has been tripled, for example, from 2° C. per hour to about 6° C. per hour. As a result of such increased cooling rate, or conversely reduced cooling cycle, the total production capacity per cycle or per furnace has been increased from about 30 to over 50 per cent. In a ring furnace employed for the production of relatively large carbon anodes for use in aluminum reduction cells, the average monthly production over a six month period was increased, by utilization of the present invention, about 51 per cent over the previous peak monthly production using old conventional methods.

The improved apparatus of the invention comprises a blower of suitable capacity and a blower manifold connected to the flue system of the cooling zone chambers, preferably through the ports in the headwall of the cooling zone chamber furthest removed from the firing zone for introducing, establishing and maintaining a forced flow of atmospheric air through the entire cooling zone and for providing preheat air for the combustion zone in the cycle of operations. In actual practice, the introduced air circulates through the flues of the furnace in both directions from the point of introduction. Thus, the air passes through the flues in a direction toward the cold chambers of the furnace which are in the process of (1) cooling and packing material blanket removal, and (2) cooling and unpacking after which it is expelled through the ports in the headwalls of these several sections behind the blower manifold. The air flow in this direction accelerates cooling of the fired charges at the intermediate and bottom portions of the chambers being further cooled and unloaded after blanket removal. A second portion of the cooling air, as stated above, circulates through the flues of the chambers in the process of cooling before blanket removal and into the flues of the chambers in the process of baking or firing wherein fuel combustion is actually occurring. Thus, there is provided a large volume of circulating air moving through the chambers in the process of cooling whereas only a relatively small volume of air is moved by the conventional waste gas exhaust system. Moreover, this volume of air is heated in its passage through the cooling zone flues, thereby supplying to the burner units a supply of preheated air for supporting combustion. This accomplishes a significant reduction in unit fuel consumption through the medium of a greater utilization of the heat contained in the calcined or baked shapes in the process of cooling than could be realized in the conventional operation affording only slight heat exchange medium circulation or movement through the cooling zone. This supply of preheated air afforded by means of the forced circulation due to the blower may be regulated to provide an optimum air to fuel ratio in the firing zone by exhausting any excess volume of air traveling toward the firing zone through the ports in the headwall of the intervening chambers in the cooling zone.

The invention thus comprises an improved method of operation and apparatus for the heat treatment of combustible material, particularly calcination of carbonaceous shaped bodies, such as electrodes, produced in ring furnaces of the indirect heat exchange type, and an improved gas flow system for such furnaces. The improved gas flow system comprises a forced circulation of air through the flues of the cooling zone into the flues of the combustion zone therein providing regulated quantities of preheated air for combustion, and an increase in the rate of movement or circulation of the products of combustion through the preheating zone thereby increasing the effective length of the preheating zone, and accordingly the capacity thereof. This gas flow system utilizes in combination both the waste gas exhausting means remotely positioned with respect to the furnace chambers and the forced air introduction means or blower positioned in the flue system at the headwalls of the cooling zone chamber furthest removed from the firing zone, thus creating a push-pull effect on the gases in the flue system to provide an ultimate driving potential or pressure head for circulation.

The invention will be described in greater detail with reference to the appended drawings which are intended as a specific illustration of a preferred embodiment of the invention and are not to be regarded as a limitation thereof in which;

Figure 1 is a diagrammatic plan view of a portion of the improved ring furnace, including two complete cycles of packing, preheating, firing, cooling, cooling and packing material blanket removal, and cooling and unpacking.

Figure 2:
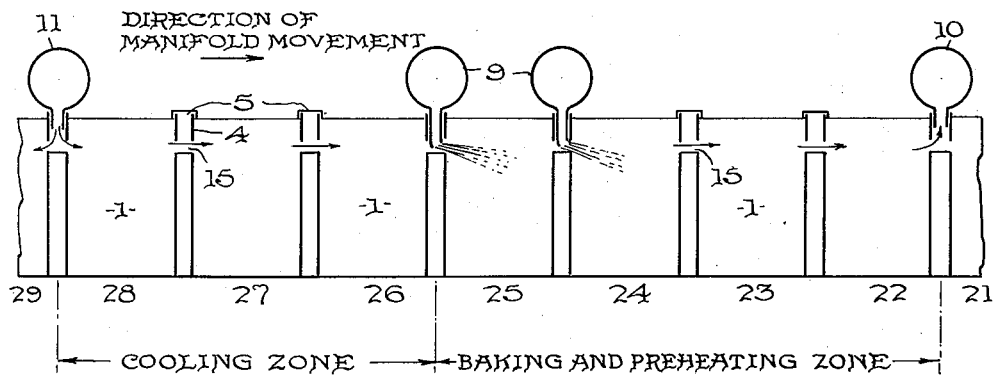
Figure 3:
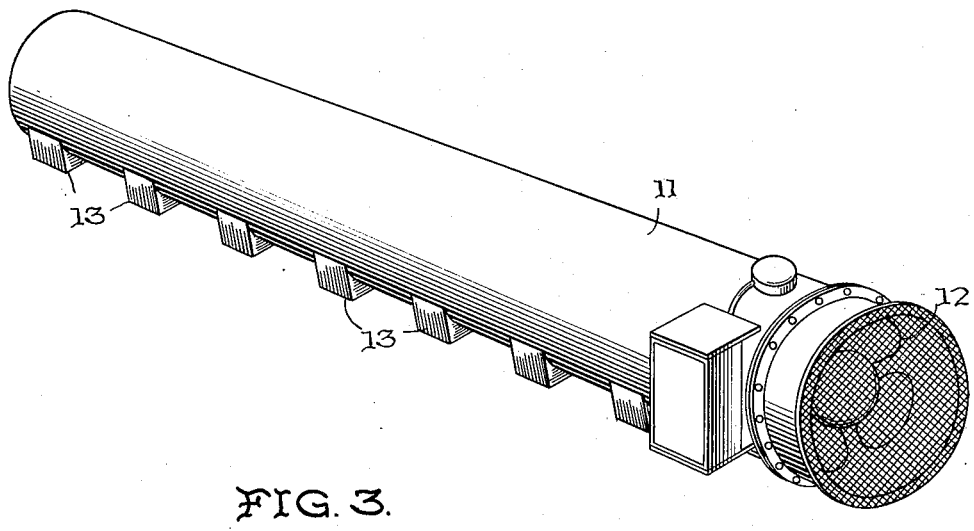

Figure 2 is a diagrammatic sectional view taken longitudinally through the flue system of a series of chambers constituting a preheating, baking or firing, and cooling zone, that is, one complete heat treatment cycle; and Figure 3 is a perspective view of a preferred embodiment of the combination of blower and manifold connected to the flue system through the escape ports in the headwalls of a transverse line or section of chambers representing the last section in the cooling zone.

Referring to Figure 1, the general construction and arrangement of the ring furnace is illustrated wherein a plurality of chambers 1 for containing the charge of carbonaceous shapes such as electrodes, together with packing material are disposed in two longitudinal series of thirty transverse lines or sections of six chambers each. The chambers 1 are rectangular pits which may be from 8 to 9 feet deep, about 10 feet in length and about 3 feet in width, or any other suitable dimensions. A flue system for indirect heat exchange comprising longitudinally disposed flues 2 contained within the hollow walls of the chambers 1 are intercommunicating throughout the entire length of both longitudinal series of chambers in the ring furnace by means of cross-over flues 3 at each end of the two series and through suitable conduits in the headwalls 4 between the respective sections or transverse lines of chambers. Also, each of the plurality of longitudinally disposed flues for each transverse line or section of chambers is provided with a normally closed escape port 5 in the headwalls between the respective sections.

The ring furnace is also provided with a continuous flue gas or waste gas exhaust main 6 for exhausting or venting the waste gases from the flue system through a suitable chimney or stack (not shown in the drawings). The waste flue gases are exhausted from the main 6 by means of the exhaust or suction fan 7 through duct 8 leading to the stack or chimney.

For each cycle of operations in the furnace, there is provided a burner or combustion unit manifold 9, a waste gas manifold 10, and, in accordance with the present invention, a blower manifold 11, all of which are progressively moved in the direction of the arrows indicated in the drawing. All three of the manifolds are adapted for connection to the flue system of the furnace through escape ports 5 in the headwalls between the various transverse lines or sections of chambers, and the waste gas manifold 10 is also adapted for connection to the flue gas exhaust main 6.

In the illustration shown in Figure 1, there are fifteen furnace sections arranged in longitudinal series constituting one complete cycle of operations in the ring furnace, for example, from section 18 through section 32. One section, such as 18, is left empty for the purpose of relining furnace walls or other maintenance work necessary. Sections 19 through 21 are those in which the green or unbaked carbon shapes are loaded into the pits or chambers 1, one on top of the other in horizontal and vertical rows within the pits and the intervening space between the shapes is filled with a protective material to exclude oxygen during the baking. This packing material is usually raw or uncalcined coke, a mixture of raw and calcined coke, or even completely calcined coke. After loading of the pits is completed a blanket of packing material of certain depth is provided on the top, the depth being regulated so that upon shrinkage of the packing material, the shapes will not become exposed during the heating and cooling cycles.

The combined heating and cooling cycles are conducted in furnace sections 22 through 28, inclusive. In sections 22, 23 and 24, the charges are progressively preheated, for example, in the so-called third preheat stage of section 22 to about 250° C., second preheat stage of section 23 to about 500° C., and in the third preheat stage of section 24 to about 750° C. The fully preheated charge of section 25 is fired in that section to a typical final baking or calcination temperature of about 1000° C., the temperature in the flues of the firing section not exceeding about 1400 to 1500° C.

In a typical accelerated operation according to the present invention, the charges are treated simultaneously in the various preheat sections and the firing section for a period of approximately 24 hours in each section, so that the rate on the heating cycle is in excess of 10° C. per hour.

The fuel supplied to the firing section may be any fluid fuel, such as gas or oil, and usually in the case of the latter a small amount of water is blended with the fuel to extend the length of the flame into the flues. The hot products of combustion from the firing section under the forced circulation provided by the blower and manifold 11 positioned at the opposite end of the cooling zone sections pass through the flues of the sections being preheated to the waste gas manifold 10, through which they pass to the exhaust mains 6 and thence are vented to the stack or chimney with the aid of the exhaust fan 7 in waste gas exhaust flue 8.

In sections 26, 27 and 28, the curtailed cooling cycle in the operation is effected with the aid of the cold atmospheric air positively forced through the flues of these sections from blower manifold 11 connected to the flues through the ports of section 28 in the headwalls thereof. Through the provision of the blower and manifold 11, the previously fired charges are cooled at a rapid rate, which in the case illustrated is 3 times the rate of cooling attained in the conventional operation wherein only the waste gas exhaust fan in duct 8 was operative to create any circulation. The air in passing through the flues of the cooling section thus takes up a major portion of the heat contained in the previously fired charges and passes to the burner units in firing section 25 in a highly preheated condition for the most efficient use as primary combustion air. For maintaining the maximum flame temperature in the firing section 25, the volume of preheated air supplied through the flues of the cooling sections may be regulated when necessary by venting a portion of this air through the escape ports 5 in the headwalls of cooling sections 27 and 26.

The three manifolds, 9, 10 and 11, under the accelerated operation of the present invention are maintained in the positions shown for a period of approximately 24 hours, after which all of them are moved concurrently in the direction shown by the arrows on the drawing, so that waste gas manifold 10 is positioned between sections 20 and 21, oil burning manifold 9 between sections 24 and 25, and blower manifold 11 between sections 27 and 28. Accordingly, it may be seen that in the cycle of operations each chamber, or transverse chamber sections, is progressively subjected to a 24-hour period of each phase of the cycle, starting with the initial preheat phase, or so-called third preheat, to the last cooling phase prior to cooling by exposure to atmospheric air with the packing material blanket removed, as indicated in section 29 in the drawing.

In the cooling zone where cooling rates of about 6° C. per hour have been attained by the present invention, the fired charges are progressively cooled as the manifolds are concurrently moved from one section to the next. Thus, in the total 72-hour period over which the fired charges in a given chamber or section are cooled without exposure to the atmosphere and by means of indirect heat exchange with the air flowing through the flues of the cooling zone, the temperature is reduced from the final firing temperature of about 1000° C. to between 550 and 600° C., at which latter temperature the top blanket of packing material may be removed without danger of spontaneous combustion or oxidation of the fired shapes.

In completing the cycle, the fired charge in the chamber section 29 is permitted to cool in contact with the atmosphere in regard to the topmost shapes therein, and in the following sections 30, 31 and 32, progressive cooling occurs, while these sections are progressively and sequentially unpacked and unloaded to increasing depths until in the last cooling and unpacking section, the bottom layer of fired shapes, sufficiently cooled to about 400 to about 450° C., may be removed.

Referring now to Figure 2, there is illustrated diagrammatically the gas flow effected according to the present invention in the flue system of the furnace in one given cycle of operations including preheating, firing and cooling. The firing or baking and preheating zones are shown as extending from flue gas exhaust manifold 10 to the latter of two burner manifolds or units 9, that is, through sections 22 to 25, inclusive, while the cooling zone is comprised of sections 26 through 28 of the furnace between the latter of the two burner assemblies and the blower manifold 11, shown connected to the flues in the headwall between sections 28 and 29. The cold atmospheric air is introduced by the blower through blower manifold 11 and passes into the flue system in both directions at the headwall 4 through the escape ports 5 between furnace sections 28 and 29 (as shown by the arrows). Although not shown in the drawings because it does not constitute any portion of the present invention, each of the flues of the several chambers in the various sections are provided with suitable baffles for creating a tortuous passage of the heat exchange gases therethrough before moving into the flues of the chambers in the adjacent section through the gas passages 15 in the intervening headwalls 4 communicating with the escape ports 5 positioned in such headwalls 4. Thus, the air passes into the flues of section 29 and succeeding sections, which are in the process of cooling with the blanket removed, and of cooling and unloading to advantageously accelerate the cooling of the charges therein, particularly in the lower portions of the chambers. The other portion of introduced air passes from the blower manifold successively through the intercommunicating flues of the sections on cooling, namely 28, 27 and 26, and during this passage, the air is rapidly preheated by extracting the heat contained in the fired chambers and charges contained therein. This preheated air which has reached a temperature of at least about 500° C. mixes with the fuel oil (and added water) injected into the flues of section 25 from burner units and manifold 9 where it supports combustion of the oil by serving as primary combustion air and greatly reduces unit fuel consumption per B. t. u. of heat input to the furnace.

In the alternative embodiment of the method and apparatus shown in Figure 2, a second burner manifold and burner unit assembly is connected to the flues of section 24, ordinarily designated as the first preheat section, in which case, the supply of fuel to the burner 9 between sections 25 and 26 is reduced by approximately ½, so that the same total B. t. u. input to the furnace will be maintained. Thus, a significant reduction in the flame temperature of both of the firing units is accomplished, which advantageously increases the life of the refractory walls of the furnace or chambers of the furnace. At the same time, the charge in section 24 is preheated to a higher temperature, for example, about 900° C., and the rate of preheating in sections 22 and 23 is slightly increased, while the firing or baking is effected over a larger total surface area of furnace wall.

The more rapid circulation induced according to the present invention by the provision of the blower also advantageously permits an increase in the preheating capacity of the furnace in a given cycle of operations. For example, where according to conventional operation it was only feasible to maintain two preceding sections on preheat preceding the firing section, now a third preheat section may be effectively heated whereby the production capacity of the furnace is still further increased while still maintaining a greatly reduced total time for the complete cycle of operations. This increased preheat capacity permits taking advantage of the increased cooling rate, the two effects together making it possible to increase overall operational rate (i. e., more rapid movement of the manifolds).

To specifically illustrate the greatly reduced total time or greatly increased rate of production, in the present invention, as illustrated in Figure 2, seven furnace sections are included in one cycle of heating and cooling operations, and a progressive movement of the three types of manifolds is conducted concurrently every 24 hours so that a total time for the completion of a given cycle on one section of the furnace is approximately 168 hours, even with an additional section on preheat in the cycle. In contrast, in conventional operation relying solely on the exhaust fan in the waste gas system, only six sections were included in one cycle of operations, namely two on preheat, one being fired, and three comprising the cooling zone. The two manifolds, that is, the burner manifold and the flue gas exhaust manifold, were progressively moved every 35 or 48 hours, requiring a total time in excess of 200 hours for one complete cycle of operations to be completed on a given furnace section. Thus, by the increased cooling rate and preheating capacity with resulting increased rate of overall operation for each cycle in the ring furnace, the peak production capacity of the furnace has been increased from 30 to about 50 per cent.

Any suitable type of fan unit may be used as the blower for providing the increased circulation rate, the large volume of cooling air for the cooling zone of the furnace and the complementary large volume of preheated air for the firing section or sections of the furnace. A preferred type of fan unit and manifold for the blower assembly is shown in perspective in Figure 3, where 11 indicates the blower manifold to which is connected fan unit 12, the blower manifold 11 being provided with ducts 13 at a plurality of points along its length, spaced apart the same distance as the escape ports in the headwalls of the several furnace sections. The escape port covers are removed for connection of the ducts 13 into the escape ports of the flue systems of the furnace sections. In a given installation a blower unit operated by a four horsepower motor and equipped with 1750 R. P. M. radial-axial fans having a capacity of 5000 C. F. M. furnished a completely adequate supply of cooling air to the furnace flues. However, it is not intended to limit the invention to a blower and blower manifold assembly of any particular specifications, since obvious modifications may be made in the number and type of units employed.

Also, various modifications and alternatives may be employed respecting the spacing relationship between the blower manifold and the burner unit, particularly where final firing temperatures are in excess of that given in the illustration set forth above, namely 1000° C., and like modifications may be made with regard to the distance between the burner units and the flue gas exhaust manifold without departing in any sense from the spirit of the invention.

The invention is fully applicable to the production of combustible or oxidizable materials whether in the form of previously molded shapes or in discrete particle form. Moreover, any suitable packing material may be used and the invention is not limited to the use of a combustible raw coke packing material. Instead, various inert materials, such as ganister or the like non-combustible materials, may be used for packing where suitable in the operation intended.

In summary in its generic aspect, the invention embraces an improved method and apparatus for heat treating combustible materials including a preheating, firing and cooling zone, comprised of a plurality of successive charge-containing chambers provided with a system of intercommunicating flues for effecting indirect heat exchange and wherein the bodies in the several chambers are simultaneously preheated, fired and cooled and the said material in each chamber is sequentially preheated, fired and cooled; which invention provides in the cooling zone for a greatly increased rate of cooling by establishing and maintaining a forced flow of air in the passages of the flue system of said cooling zone in the direction of the chamber or chambers being concurrently fired to thereby also provide preheated combustion air for the firing zone and to additionally provide increased rate of circulation of gases within the flues of the preheating zone to still further increase production capacity by increasing the preheating capacity of the furnace. Specifically, the invention contemplates the provision of a blower unit and manifold for introduction of large volumes of atmospheric air into the cooling zone of the furnace to provide an improved gas flow system, which accomplishes a greatly increased cooling rate therein, and provides preheated air to the combustion zone and increases preheating zone capacity. Accordingly, the invention should be limited only by the true scope of the appended claims.

We claim:

1. A ring furnace for heat treating combustible carbonaceous shapes wherein the shapes are protected against burning by a suitable protective blanket of packing material, said furnace comprising a series of longitudinally disposed successive sections, including preheating, firing and cooling zones, each section comprising a plurality of chambers adapted to contain a charge of carbonaceous shapes and protective blanket, and indirect heat exchange flue system comprising a plurality of flues disposed between the chambers of each section and longitudinally interconnecting between sections including those comprising the preheating, firing and cooling zones, normally closed ports in the flues of each furnace section, a fuel injection manifold and fluid fuel burner units adapted for connection through the escape ports of the furnace section comprising the firing zone, a flue gas exhaust manifold adapted for connection to the escape ports of the preheating zone section farthest removed from the firing zone, and in combination a blower and blower manifold adapted for connection to the escape ports of the cooling zone section farthest removed from the firing zone to provide increased volumes of cooling air in said zone to increase the cooling rate of the fired shapes prior to blanket removal, an increased volume of preheated combustion air to the firing zone, and an increased preheating zone capacity.

2. An apparatus according to claim 1 in which an additional fuel injection manifold and burner unit assembly is connected to the flue ports of the section in the preheating zone adjacent to the firing zone section.

3. An apparatus according to claim 1 in which the normally closed ports between the blower manifold and fuel injection manifold are opened to regulate air volume to the burner units.

4. In a process of heat treating combustible material in a ring furnace comprising disposing the material in a plurality of successive chambers provided with a system of intercommunicating flues wherein the material in a given series of said successive chambers is concurrently indirectly preheated, fired, cooled, and unloaded in one cycle of operations, and the said material in each chamber is successively indirectly preheated, fired by fuel combustion, and cooled, and thereafter unloaded as the cycles of operation are progressively initiated and conducted on succeeding chambers, and wherein the products of combustion in the flue system from the firing chambers are drawn in through the flues in the preheating chambers and exhausted, the improvement which comprises additionally blowing air into the flue system between the chambers being cooled and unloaded, dividing the air blown into the flue system into two portions, one portion of which enters the flues of the cooling chambers in the direction of the the firing chambers thereby increasing the rate of cooling of the fired material in the cooling chambers and also providing preheated air for fuel combustion, the other portion of said blown air being passed in the opposite direction in heat exchange relation with the chambers being unloaded to increase the cooling thereof throughout the depth of the chambers.

5. A process according to claim 4 in which the volume of preheated air passing to the flues of the firing chambers is regulated by venting any excess portion from the flues of the cooling chambers.

6. In a ring furnace of the indirect heat exchange type having a plurality of sections comprising preheating, cooling, and unloading zones, and at least one section comprising the firing zone interposed between said preheating and cooling zones, each section comprising at least one charge-containing chamber, a flue system interconnecting the sections of the zones, normally closed ports in the flues of each furnace section, fuel injection means for the flues of the firing zone and flue exhaust means positioned at the first section of the preheating zone, and in combination a blower means for the flue system between the cooling zone and unloading zone whereby an increased flow of air is supplied to the flue system and whereby the supply of forced air is divided, one portion of which enters the flue system in the cooling zone to provide a forced flow of air for accelerated cooling of the fired charge and preheated combustion air for the firing zone, and the other portion of which is passed in the opposite direction in heat exchange relation with the chambers comprising the unloading zone to increase the cooling thereof throughout the depth of the chambers, and wherein the normally closed ports between the blower means and fuel injection means are adapted to be opened to regulate air volume to the fuel injection means.

7. An improved method for heat treating combustible shapes which comprises placing the shapes in a series of chambers provided with intercommunicating indirect heat exchange passages wherein each chamber progressively becomes a part of a preheating, firing and cooling zone, covering the shapes with packing material, progressively heating the shapes in a selected number of successive chambers with combustion gases flowing through the passages of said chambers and obtained by firing preheated shapes in at least one succeeding chamber by means of fluid fuel combustion in the passages thereof, said combustion gases being exhausted after flowing through the passages of the preheating zone, concurrently progressively cooling fired shapes in a selected number of chambers succeeding the firing zone at an increased rate before uncovering by establishing and maintaining an increased forced flow of air into the passages of said cooling zone chambers in the direction of the firing zone thereby also providing preheated air for fuel combustion, progressively uncovering and unloading the fired partially cooled shapes in a number of chambers succeeding the cooling zone, and effecting further cooling therein by introduction of a portion of the air established and maintained under forced flow into the heat exchange passages thereof.

8. In a process for calcining shaped carbon bodies in a ring furnace comprising a series of charge-containing chambers provided with an interconnecting indirect heat exchange flue system wherein the cycle of operations includes simultaneously preheating, firing and cooling the bodies in zones comprised of successive chambers, and progressively preheating, firing by fuel combustion, and cooling the bodies in each chamber as the cycles of operation are progressively initiated and conducted on successive chambers throughout the series, the improvement comprising positively supplying an increased volume of air to the flue system at the low temperature end of the cooling zone and dividing said increased supply of air, one portion being passed through the cooling zone to accelerate cooling of the fired bodies in said zone, and the other portion being passed in the opposite direction in heat exchange relation with the chambers being unloaded and containing partially cooled baked carbon bodies to increase the cooling thereof throughout the depth of the chambers.

9. An improved method for heat treating combustible shapes which comprises placing the shapes in a series of chambers provided with intercommunicating indirect heat exchange passages wherein each chamber progressively becomes a part of a preheating, firing and cooling zone, covering the shapes with packing material, progressively heating the shapes in a selected number of successive chambers with combustion gases flowing through the passages of said chambers and obtained by firing preheated shapes in at least one succeeding chamber by means of fluid fuel combustion in the passages thereof, said combustion gases being exhausted after flowing through the passages of the preheating zone, concurrently progressively cooling fired shapes in a selected number of chambers succeeding the firing zone at an increased rate before uncovering by establishing and maintaining an increased forced flow of air into the passages of said cooling zone chambers in the direction of the firing zone thereby also providing preheated air for fuel combustion, and regulating the volume of preheated air passing to the firing zone passages by venting any excess portion from the cooling zone.

10. In a process of heat treating combustible material in a ring furnace comprising a series of charge-containing chambers provided with an interconnecting indirect heat exchange flue system wherein each chamber progressively becomes a part of a preheating, firing and cooling zone, progressively heating said material in a selected number of successive chambers with combustion gases flowing through the flues of said chambers and obtained by firing preheated material in at least one succeeding chamber by means of fuel combustion in the flues thereof, and progressively cooling fired material in a selected number of chambers succeeding the firing zone, the combination therewith comprising additionally blowing an increased volume of air through the flues of the cooling zone toward the firing zone flues to accelerate cooling of the fired material and to supply preheated air for fuel combustion, and regulating the volume of preheated air passing to the firing zone flues by venting any excess portion from the cooling zone.

References Cited in the file of this patent

UNITED STATES PATENTS

| | | |
|---|---|---|
| 863,704 | Dupuy | Aug. 20, 1907 |
| 1,170,313 | Nagelschmitz | Feb. 1, 1916 |
| 1,529,977 | Wickland | Mar. 17, 1925 |
| 2,374,392 | St. Pierre | Apr. 24, 1925 |
| 2,140,825 | Zuckert | Dec. 20, 1938 |
| 2,518,040 | Mann | Aug. 8, 1950 |